Figure 1:
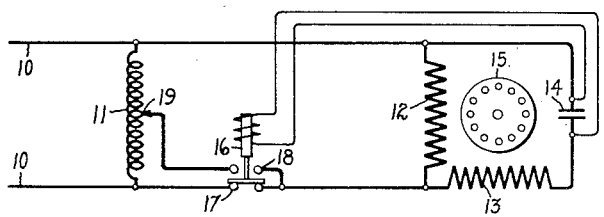

March 12, 1940.  A. F. LUKENS  2,193,634
CAPACITOR MOTOR CONTROL
Filed Oct. 21, 1938

Inventor:
Alan F. Lukens,
by Harry E. Dunham
His Attorney.

Patented Mar. 12, 1940

2,193,634

UNITED STATES PATENT OFFICE 2,193,634

CAPACITOR MOTOR CONTROL

Alan F. Lukens, Lynn, Mass., assignor to General Electric Company, a corporation of New York Application October 21, 1938, Serial No. 236,233

2 Claims. (Cl. 172—278)

My invention relates to the control of capacitor motors and in particular to the automatic control of the starting of variable speed capacitor motors which are provided with means for varying the voltage on the motor as by an adjustable auto-transformer. According to my invention, I provide for the quick starting of the motor on full voltage, and relay means responsive to the speed condition of the motor for reducing the voltage on the motor to the point desired as soon as the motor has started.

The features of my invention which are believed to be novel and patentable will be pointed out in the claims appended hereto. For a better understanding of my invention, reference is made in the following description to the accompanying drawing showing in Fig. 1 the application of my invention to a capacitor motor in which no reduction in capacity in the starting winding circuit is made between starting and running conditions and Fig. 2 shows the invention applied to a motor in which a portion of the capacity in the starting winding circuit is cut out after starting.

In the drawing, like parts are referred to by like reference characters in the two figures.

Figure 2:
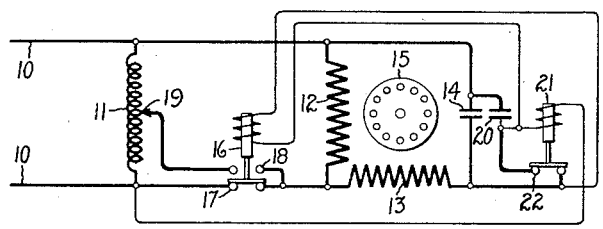

In Fig. 1, 10 represents a source of single phase supply across which an adjustable auto-transformer 11 is connected. The transformer is for the purpose of obtaining different voltages for the motor. The main winding of the motor is designated 12. 13 is the auxiliary or condenser winding and has a condenser 14 permanently connected in its circuit. 15 represents the squirrel cage rotor of the motor.

The automatic control of the motor is accomplished by the relay 16. It will be noted that this relay has a normally closed position which is shown in the drawing and which connects the common point of the main and auxiliary windings to one end of transformer 11. The other terminal of the parallel connected motor winding circuits is connected to the other end of the transformer. In this case this also connects the motor across the line but these line and motor terminal connections to the transformer need not necessarily be the same. When relay 16 is energized, it opens the connection shown at 17 and closes another energizing circuit through contacts 18. This reduces the voltage applied to the motor by an amount determined by the setting of the adjustable contact 19. This is the running connection and the running speed of the motor will be determined by the position of contact 19. It is often desirable to vary the running speed of the motor by as much as 100 per cent and it is intended that this may be done by adjustment of contact 19.

Now it is desirable that the motor be connected as shown for full voltage excitation at start in order that the energy supplied will be ample to overcome the static standstill load condition and promptly bring the motor up to speed. If, however, the motor is to run at a speed selected by the position of tap 19, it is necessary that the relay open contacts 17 and close contacts 18 shortly after the motor has started. Such change in connections may vary the voltage on the motor very materially and hence we must provide a relay and energizing circuit therefor which will function properly under the worst condition to be met with, i. e., when tap 19 is adjusted for the lowest running speed desired. I accomplish the desired results by connecting the energizing winding of the relay across the terminals of condenser 14. Relays for modifying condenser motor connection have sometimes been connected across the starting winding, since it is known that there is ordinarily an increase in voltage across the auxiliary winding as the motor comes up to speed, due to the increased transformer action between the main and auxiliary windings through the rotor. Such a connection is not satisfactory for the purposes of this invention, but I have found that with a properly designed relay, the connection of the relay as shown is satisfactory. This point may be clarified by the following typical example.

Assume a 220 volt motor having a synchronous speed of 1800 R. P. M. At start the voltages across the condenser 14 and starting winding 13 are of the order of 220 and 230 volts, respectively. At full running speed with full voltage on the motor, the voltages across the condenser and auxiliary winding would rise to about 440 and 380 volts respectively. However, when relay 16 operates, we no longer have full voltage on the motor, nor do we always desire or have a speed that would produce the 440 and 380 volts mentioned, due to transformer action through the rotor. If we assume that tap 19 is adjusted to give a 1100 R. P. M. operating speed, the voltages across the condenser 14 and auxiliary winding 13 at such speed would be not more than about 200 and 170 respectively, instead of 440 and 380. The relay used must be energized in such a way that it will not pick up at the instant of starting, will pick up to change the motor connections for low speed operation when the motor has started, and will hold these connections after the motor voltage has been materially lowered by such change in connections and drop out when the motor is deenergized.

I have found that a relay may be connected across condenser 14 and perform the desired functions. By using a relay properly designed for this purpose, it is possible to have it function reliably to change and maintain the changed motor connections when the tap 19 is adjusted to obtain a running speed down to 50 per cent of synchronous speed. Obviously, if it will function properly under these conditions, it will also do so for higher speed adjustments.

It will be noted that when relay 16 operates to change the motor connections between starting and running conditions, the motor is momentarily disconnected from line 10 at contacts 17 before being reconnected at contacts 18. It might appear that this would cause relay 16 to fail to pick up and complete the running connections. However, such is not the case, since there is sufficient voltage induced in the starting winding circuit and across the condenser 14 due to rotation of the rotor during this transfer period to cause relay 16 to complete its operation, and immediately it is subjected to the holding voltage condition.

Fig. 2 is very much like Fig. 1 except that the motor is provided with an extra starting capacitor 20 and a relay 21 for cutting such condenser out of circuit when the motor comes up to speed. The coil of relay 21 is connected across the starting winding 13 through the contacts 22 of this relay. Hence, the voltage on its winding rises with the speed of the motor, operates the relay, and cuts out condenser 20 as soon as the motor is started. The voltage on its coil then drops to approximately line voltage since its coil is then connected across the line through the now practically idle condenser 20. This voltage is sufficient to maintain the relay in the open contact position while the motor is running. It is noted that the line connection to relay 21 is on the line side of switch 17 and hence the excitation of relay 21 is not altered by the opening of switch 17.

Relay 16 is connected across the contacts 22 of relay 21, and hence cannot operate to reduce the motor voltage until relay 21 operates. However, as soon as relay 21 operates, the coil of relay 16 becomes connected across condenser 14 through the now practically idle condenser 20 and hence is subjected to the voltage across condenser 14. Relay 16 then operates and holds open the same as in Fig. 1 during the lowered voltage operation of the motor. It is noted that advantage is taken of the presence of relay 21 to short circuit the coil of relay 16 at the instant of starting, hence relay 16, in this case, does not necessarily need to be designed to prevent its operation at the instant of starting. In general, however, where both types of motor equipments are sold, the transformer 11 and relay 16 will be standard and may be used with either equipment.

It will be noted that tap 19 may be set for a desired operating speed before starting and may be adjusted to vary the speed after starting over the entire speed operating range for which the equipment is designed.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination a single phase capacitor motor having main and starting windings, a running condenser permanently included in the starting winding circuit, a transformer associated with said motor for providing different operating voltages for said motor, an electro-magnetically operated switch between said transformer and motor through which the motor is energized, said switch having a normally deenergized position for connecting said motor for high voltage starting and an operatively energized position for connecting said motor for low voltage operation, a tap on said transformer in the last mentioned connection for varying the low voltage supplied to the motor, an energizing winding for the electromagnetically operated switch, an energizing circuit for said energizing winding through which the winding may be energized in response to the voltage across said running condenser, a starting condenser included in the starting winding circuit, and speed responsive switching means for cutting said starting condenser out of circuit when the motor is started and comes up to speed, said last mentioned switching means providing a short circuit across the energizing circuit of said electro-magnetically operated switch energizing winding, which short circuit is removed when said starting condenser is cut out of circuit.

2. A variable speed single phase capacitor motor and control comprising main and starting windings for the motor, a transformer having a fixed terminal and an adjustable tap, a relay switch which when deenergized completes an energizing circuit to said motor only through said fixed terminal, and when operatively energized completes an energizing circuit to said motor only through said adjustable tap, said adjustable tap circuit providing for a lower motor voltage than the fixed terminal circuit, running and starting condensers connected in parallel with each other and in series with the starting winding, a switch responsive to the speed of the motor for opening the circuit of only the starting condenser when the motor is started and comes up to speed, and an energizing winding for said relay switch connected across the terminals of said speed responsive switch and subject to the voltage across the running condenser when said speed responsive switch is open.

ALAN F. LUKENS.